(12) United States Patent
Akamatsu et al.

(10) Patent No.: US 10,523,092 B2
(45) Date of Patent: Dec. 31, 2019

(54) VEHICLE AC POWER GENERATOR

(71) Applicant: Mitsubishi Electric Corporation, Tokyo (JP)

(72) Inventors: Katsuya Akamatsu, Tokyo (JP); Kazunori Tanaka, Tokyo (JP); Kyoko Higashino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 362 days.

(21) Appl. No.: 15/541,817

(22) PCT Filed: May 15, 2015

(86) PCT No.: PCT/JP2015/063992
§ 371 (c)(1),
(2) Date: Jul. 6, 2017

(87) PCT Pub. No.: WO2016/185510
PCT Pub. Date: Nov. 24, 2016

(65) Prior Publication Data
US 2018/0006536 A1    Jan. 4, 2018

(51) Int. Cl.
*H02K 11/05* (2016.01)
*H02K 11/33* (2016.01)
(Continued)

(52) U.S. Cl.
CPC ............. *H02K 11/05* (2016.01); *H02K 5/225* (2013.01); *H02K 9/06* (2013.01); *H02K 11/046* (2013.01);
(Continued)

(58) Field of Classification Search
CPC ........ H02K 11/05; H02K 11/33; H02K 5/225; H02K 9/06; H02K 11/046
See application file for complete search history.

(56) References Cited

U.S. PATENT DOCUMENTS

| 7,795,765 B2 * | 9/2010 | Oohashi | H02K 19/365 310/58 |
| 8,212,441 B2 * | 7/2012 | Oohashi | H02K 5/141 310/239 |

(Continued)

FOREIGN PATENT DOCUMENTS

| CN | 102754315 A | 10/2012 |
| CN | 102906975 A | 1/2013 |

(Continued)

OTHER PUBLICATIONS

Communication dated May 13, 2019 issued by the Mexican Institute of Industrial Property in counterpart application No. MX/a/2017/014457.

(Continued)

*Primary Examiner* — Robert W Horn
(74) *Attorney, Agent, or Firm* — Sughrue Mion, PLLC; Richard C. Turner

(57) ABSTRACT

A vehicle AC power generator includes a protection cover disposed at the rear side of a rear bracket included in a housing of the vehicle AC power generator, an attachment bolt that penetrates a through-hole formed in a bottom portion of a protection cover and is fixed to a portion at one axle-direction side of the housing, an output terminal bolt that extends from a rectifier, which rectifies AC electric power, toward the outside of one axle-direction side of the protection cover, and an insert coated conductor that is supported by the output terminal bolt and the attachment bolt and is provided at the rear surface of the protection cover.

6 Claims, 7 Drawing Sheets

(51) Int. Cl.
*H02K 9/06* (2006.01)
*H02K 5/22* (2006.01)
*H02K 19/36* (2006.01)
*H02K 11/04* (2016.01)
*H02K 5/20* (2006.01)

(52) U.S. Cl.
CPC .......... *H02K 11/33* (2016.01); *H02K 19/365* (2013.01); *H02K 5/20* (2013.01)

(56) References Cited

U.S. PATENT DOCUMENTS

| | | | | |
|---|---|---|---|---|
| 8,816,549 | B2* | 8/2014 | Shinosaka | H02K 11/046 310/71 |
| 9,041,263 | B2* | 5/2015 | Tanaka | H02K 11/0094 310/43 |
| 9,559,562 | B2* | 1/2017 | Walme | H02K 5/20 |
| 10,038,347 | B2* | 7/2018 | Chisaka | H02K 5/225 |
| 10,069,432 | B2* | 9/2018 | Yokoyama | H01L 23/36 |
| 10,074,592 | B2* | 9/2018 | Bradfield | H02K 9/06 |
| 10,097,068 | B2* | 10/2018 | El Baraka | H02K 11/048 |
| 2007/0207652 | A1 | 9/2007 | Tsuruta | |
| 2008/0061641 | A1* | 3/2008 | Koumura | H02K 11/046 310/71 |
| 2012/0306300 | A1 | 12/2012 | Ishikawa et al. | |
| 2013/0057121 | A1 | 3/2013 | Izumi et al. | |
| 2013/0154407 | A1 | 6/2013 | Isoda et al. | |
| 2017/0302136 | A1* | 10/2017 | Akiyoshi | H02K 9/06 |
| 2018/0006536 | A1* | 1/2018 | Akamatsu | H02K 11/05 |
| 2018/0219462 | A1* | 8/2018 | Nagy | H02K 15/14 |
| 2019/0097486 | A1* | 3/2019 | Ikeda | H02K 15/022 |

FOREIGN PATENT DOCUMENTS

| | | |
|---|---|---|
| CN | 103155369 A | 6/2013 |
| EP | 2546962 A1 | 1/2013 |
| JP | 7-322556 A | 12/1995 |
| JP | 3183035 B2 | 7/2001 |
| JP | 2007-124844 A | 5/2007 |
| JP | 2007-234561 A | 9/2007 |
| JP | 2011-193596 A | 9/2011 |
| JP | 2011-250562 A | 12/2011 |
| WO | 2012/081068 A1 | 6/2012 |

OTHER PUBLICATIONS

Communication dated Jun. 17, 2019 from the State Intellectual Property Office of the P.R.C. in counterpart Application No. 201580079628.8.
Communication dated Apr. 17, 2018 issued by the Japanese Patent Office in counterpart application No. 2017-518623.
International Search Report of PCT/JP2015/063992, dated Jul. 14, 2015. [PCT/ISA/210].
Communication dated Dec. 5, 2018 from the European Patent Office in application No. 15892511.5.
Communication dated Dec. 5, 2018 from the State Intellectual Property Office of the P.R.C. in application No. 201580079628.8.

* cited by examiner

VEHICLE AC POWER GENERATOR

CROSS REFERENCE TO RELATED APPLICATIONS

This application is a National Stage of International Application No. PCT/JP2015/063992 filed May 15, 2015, the contents of all of which are incorporated herein by reference in their entirety.

TECHNICAL FIELD

The present invention relates to a vehicle AC power generator that is driven by a vehicle engine so as to generate electric power.

BACKGROUND ART

In a vehicle AC power generator of recent years, downsizing and output-boasting have further been promoted and hence an increase in the self-heating amount results in a temperature rise; therefore, it is required to efficiently cool the vehicle AC power generator. As measures therefor, there often adopted a configuration in which heat-generating components such as a rectification circuit, an IC regulator, a slip ring, and a brush are arranged at the bottom-plate portion of a rear bracket. However, because the heat-generating components are high-voltage devices, it is required to prevent contact from the outside; thus, a rear cover is mounted thereon so that the heat-generating components are protected. Accordingly, the rear cover has a bottomed tubular shape having an inner housing space, i.e., a bowl shape.

For example, Embodiment 6 of Japanese Patent Application Laid-Open No. H07-322556 (Patent Document 1) discloses a vehicle AC power generator provided with a duct cover configured in the same manner as the foregoing rear cover. The vehicle AC power generator disclosed in Patent Document 1 is configured in such a way that an insert coated conductor, as an extension member of axis-direction output terminal on which a current-supply harness from a vehicle is mounted, at a time when a radial-direction output terminal is situated at a side opposite thereto with respect to the axle core of the power generator is placed along the outside of the duct cover and is fixed along with the duct cover to the bracket.

Meanwhile, Japanese Patent Application Laid-Open No. 2011-250562 (Patent Document 2) discloses a rear cover in which there is integrally provided a protrusion portion, as a harness detent, that undergoes circumferential-direction force produced at a time when a current-supply harness from a vehicle is fixed to the output terminal in such a way as to be fastened with a nut. Patent Document 2 discloses a configuration in which in order to counteract the force exerted on the protruding portion formed around a through-hole provided in such a way as to penetrate the bottom wall portion of a rear cover produced thinly with a resin, an engagement opening portion provided in a side wall portion of the cover and an engagement nail of a rectification-circuit mold terminal are engaged with each other so that the strength is secured.

[Patent Document 1] Japanese Patent Application Laid-Open No. H07-322556

[Patent Document 2] Japanese Patent Application Laid-Open No. 2011-250562

DISCLOSURE OF THE INVENTION

Problems to be Solved by the Invention

In the vehicle AC power generator disclosed in Patent Document 1, it is made possible that without changing the specification of the duct cover and only by attaching and detaching the coated conductor, the output terminal can readily be arranged at any one of various portions. However, there has been a problem that because both the coated conductor and the duct cover are each fixed to the bracket with a through-bolt and a fastening nut, the housing space in the rear cover portion of the duct cover is narrowed. Alternatively, the through-bolt portion may further protrude in the radial direction. In other words, although universal use of the components and the degree of flexibility in arranging the output terminal are secured, the efficient coolability for heat-generating components and the vehicle mountability are deteriorated.

Moreover, in the case where as disclosed in Patent Document 2, the protruding portion, as a detent for the current-supply harness, is provided in the rear cover, there has been a problem that because of the position or the configuration of the output terminal, it is required to prepare a great number of rear covers, the universal use of the components is not promoted. Furthermore, there has been a problem that because the size of the resin-mold die for the rear cover is relatively large, the production cost for maintaining the die and the like increases. Originally, the current-supply harness is unique depending on a vehicle manufacturer; thus, a great number of detent configurations therefor may exist.

The present invention has been implemented in order to solve the foregoing problem; the objective thereof is to obtain a vehicle AC power generator that realizes both universal use of large components and the coolability of the power generator.

Means for Solving the Problems

A vehicle AC power generator according to the present invention includes a rotor that is fixed on a rotation axle pivotably supported by a housing and is disposed in the housing, a stator that has a stator iron core and a stator winding wound around the stator iron core and is supported by the housing in such a way as to surround the rotor, a rectifier that is disposed at the outside of one axle-direction side of the housing, that is fixed to the housing, and that rectifies AC electromotive force generated across the stator winding, a voltage adjuster that is disposed at the outside of one axle-direction side of the housing, that is fixed to the housing, and that adjusts the voltage value of the AC electromotive force to a specified value, and a resin-made protection cover that is produced in the shape of a bottomed tube having a bottom portion and a tubular circumferential wall portion and that is mounted on the housing in such a way as to cover the rectifier and the voltage adjuster; the vehicle AC power generator is characterized by including an attachment member that penetrates a through-hole formed in the bottom portion of the protection cover and is fixed to a portion at one axle-direction side of the housing, an output terminal that extends from the rectifier toward the outside of one axle-direction side of the protection cover, and an insert coated conductor that is supported by the output terminal and the attachment member, that is provided on the rear surface of the protection cover, and that is formed as a member separated from the protection cover.

Advantage of the Invention

The present invention makes it possible to obtain vehicle AC power generator that can universalize components without lowering the degree of flexibility is wiring-connection with a vehicle, that reduces the production cost, and that does not degrade the coolability thereof.

Objectives, features, aspects, and advantages other than the foregoing objective of the present invention will become more apparent from the following detailed description of the present invention when taken in conjunction with the accompanying drawings.

BEST MODE FOR CARRYING OUT THE INVENTION

Hereinafter, preferred embodiments of a vehicle AC power generator according to the present invention will be explained by use of the drawings.

Embodiment 1

Figure 1:
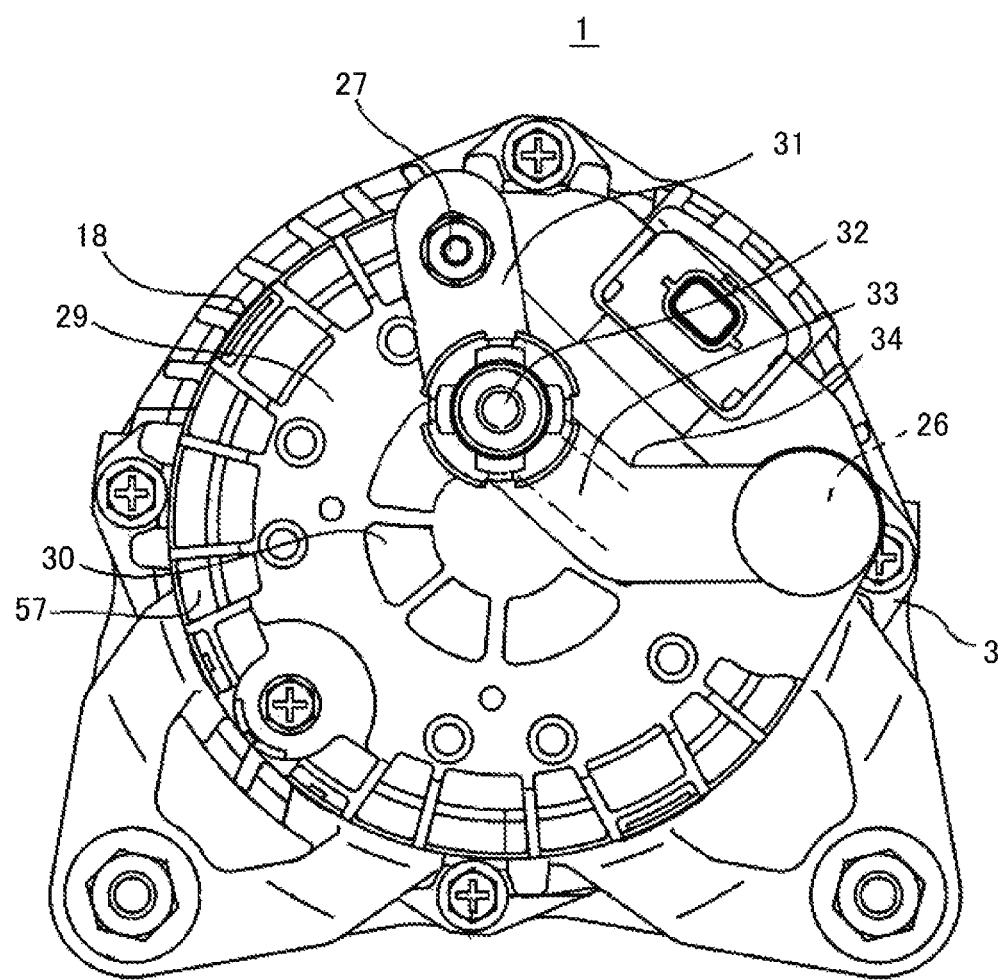
FIG. 1 is a rear view of a vehicle AC power generator according to Embodiment 1 of the present invention.
Figure 2:
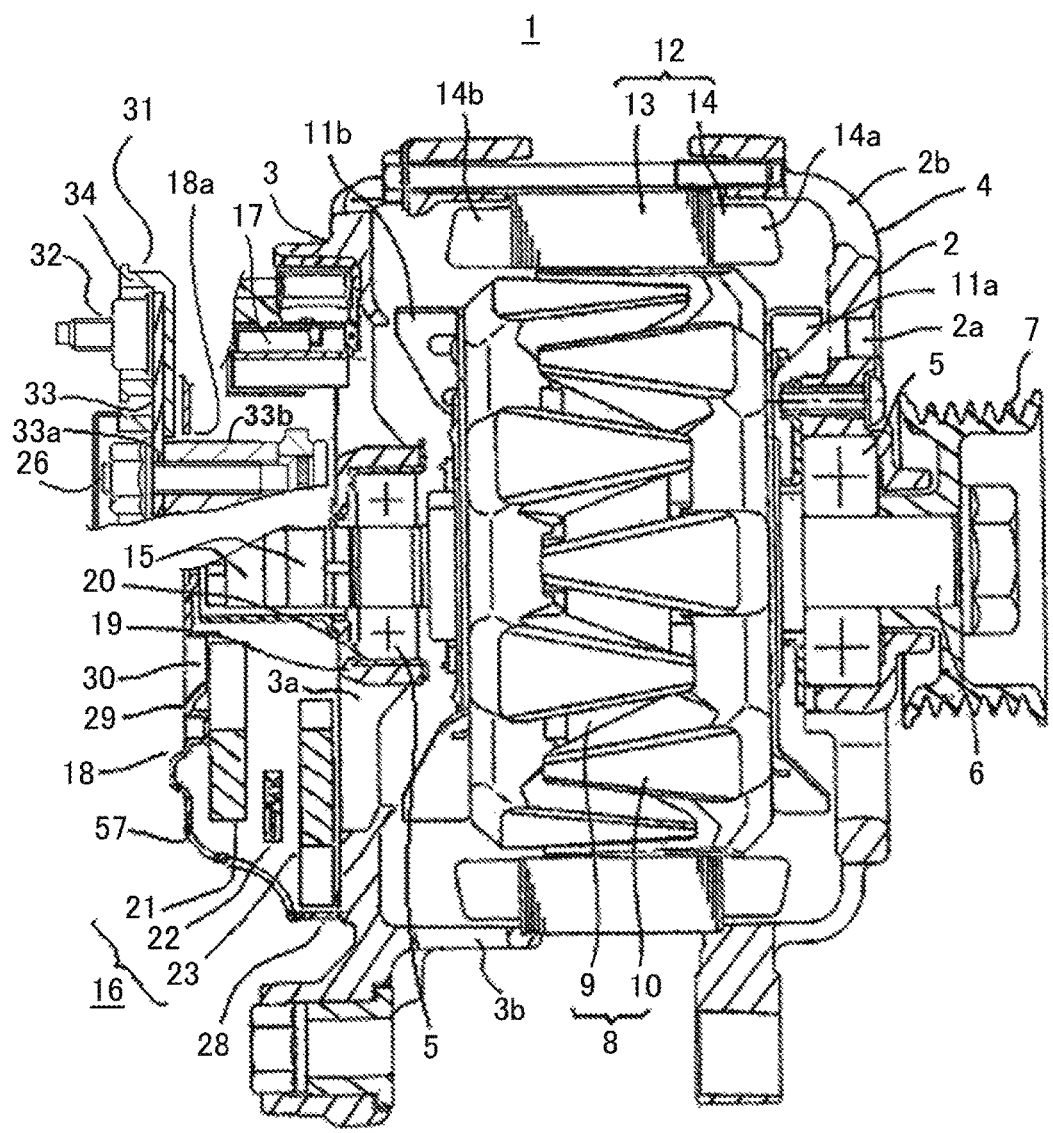
FIG. 2 is a partial longitudinal cross-sectional view of the vehicle AC power generator in FIG. 1.

FIG. 1 is a rear view of a vehicle AC power generator according to Embodiment 1 of the present invention; FIG. 2 is a partial cross-sectional view of the vehicle AC power generator in FIG. 1.

In FIGS. 1 and 2, a vehicle AC power generator 1 is provided with a housing 4 including an approximately bowl-shaped aluminum front bracket 2 and an approximately bowl-shaped aluminum rear bracket 3, a rotation axle 6 pivotably supported by the housing 4 through a pair of bearings 5, a pulley 7 fixed on an end portion of the rotation axle 6 extending toward the front side of the housing 4, and a rotor 8 that is fixed on the rotation axle and is disposed in the housing 4. The rotor 8 is provided with a magnetic-field winding 9 that is supplied with a magnetizing current and generates magnetic flux and a pole core 10 that is provided in such a way as to cover the magnetic-field winding 9 and in which a magnetic pole is formed by the magnetic flux.

The vehicle AC power generator 1 is also provided with fans 11a and 11b that are fixed on the respective axis-direction endfaces of the rotor 8 and a stator 12 fixed to the housing 4 in such a way as to surround the rotor 8. The stator 12 is provided with a cylindrical tubular stator iron core 13 and a stator winding 14 that is wound around the stator iron core 13 and in which an alternating current is generated by a change in the magnetic flux from the magnetic-field winding 9, as the rotor 8 rotates; the stator iron core 13 is disposed in such a way as to be flanked with the front bracket 2 and the rear bracket 3 flank from the both sides in the axis direction and in such a way as to surround the rotor 8. In this case, the rotor 8 is a 12-pole rotor, and the number of slots formed in the stator iron core 13 is set to 72. That is to say, two slots are formed for each pole and each phase. The stator winding 14 is formed of two groups of Y-connection three-phase AC windings.

Figure 3:
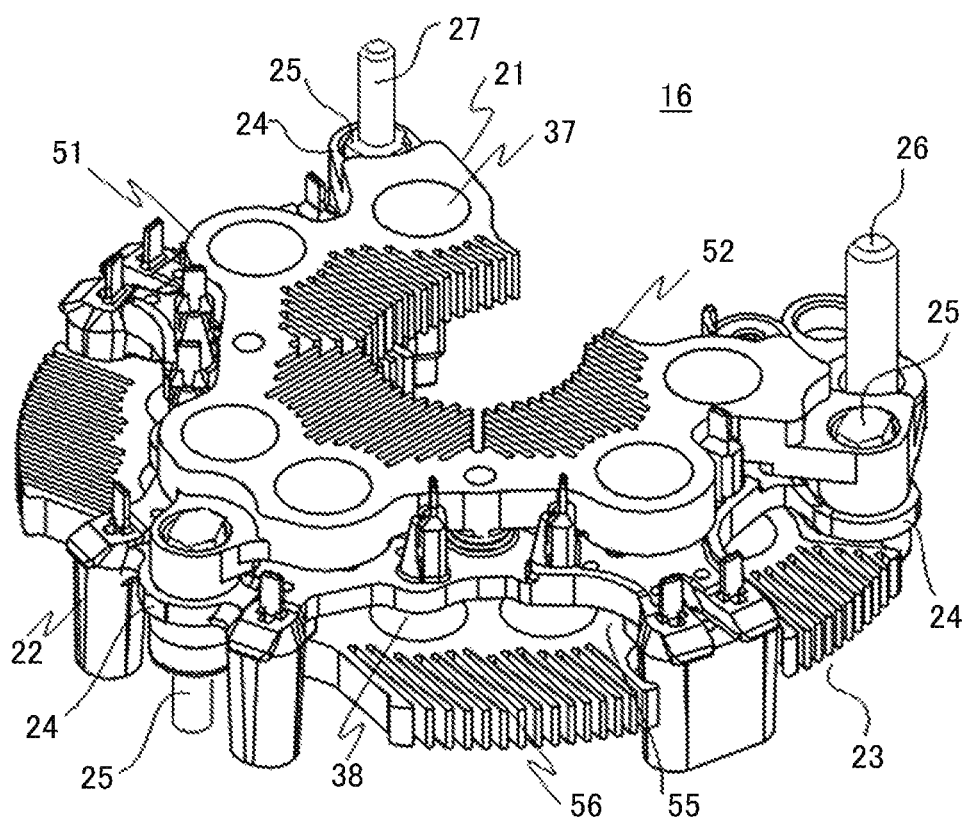
FIG. 3 is a perspective view of a rectifier of the vehicle AC power generator in FIG. 1.

The vehicle AC power generator 1 is provided with a pair or slip rings 15 that is fixed on an extending portion of the rotation axle 6, which extends toward the rear side of the housing 4, and that supplies an electric current to the rotor 8 and a rectifier 16 that is produced in such a way as to be approximately C-shaped, as illustrated in after-mentioned FIG. 3, and rectifies electromotive force generated across the stator winding 14. At the outer circumference side of the slip rings 15 and on the plane perpendicular to the center axis of the rotation axle 6, the rectifier 16 is disposed in the shape of a sector whose center is the rotation axle 6.

The vehicle AC power generator 1 is further provided with a pair of brushes (unillustrated) that is contained in a brush holder (unillustrated) disposed at the outer circumference side of the pair of slip rings 15 and in a space between the respective front ends of the approximately C-shape rectifier 16 and that slides on the pair of slip rings 15, a voltage adjuster 17 that is mounted on the brush holder and adjusts the voltage value of AC electromotive force generated across the stator winding 14 to a specified value, a connector (unillustrated) that is disposed at the rear side of the rear bracket 3 and performs signal inputting/outputting between external apparatuses and the voltage adjuster 17 and the like, and an insulating-resin protection cover 18 that is mounted on the rear bracket 3 in such a way as to cover the rectifier 16, the brush holder, and the voltage adjuster 17.

Air inlet 2a and 3a are formed in portions, of the front bracket 2 and the rear bracket 3, respectively, that face the respective corresponding axis-direction endfaces of the rotor 8. Air outlets 2b and 3b are formed at the external circumferential portions of the front bracket 2 and the rear bracket 3, respectively, in such a way as to be situated at the respective radial-direction outer sides of coil ends 14a and 14b of the stator winding 14. The bearing 5 at the rear side is fixed on a bearing mounting portion 19 provided in the rear bracket 3, through a holder 20.

FIG. 3 is a perspective view of the rectifier 16. The rectifier 16 is formed of a first heat sink 21, a circuit board 22, and a second heat sink 23 that are sacked on one another with predetermined gaps. Setting the thickness direction of the first heat sink 21, i.e., the laminating direction of the first heat sink 21, the circuit board 22, and the second heat sink 23 to the axis direction, the rectifier 16 is disposed in an arc-shaped manner at the outer circumference side of the slip ring 15 in such a way that the second heat sink 23 faces the endface of the rear bracket 3. Then, a fixing bolt 25 penetrating a housing coupling portion 24 is fastened to the rear bracket 3, so that the rectifier 16 is fixed to the rear bracket 3. From the first heat sink 21 side, the fixing bolt 25 penetrates the housing coupling portion 24 through the intermediary of an unillustrated insulating member.

As a result, at the rear side of the rear bracket 3, the rectifier 16 is disposed in the shape of an approximate arc whose center is the rotation axle 6, in such a manner that the surface of the first heat sink 21 is situated on a plane perpendicular to the center axis of the rotation axle 6. Respective lead wires (unillustrated) of the two groups of three-phase AC windings included in the stator winding 14 are pulled out from the rear bracket 3 toward the rear side and are inserted into corresponding stator winding connection portions (unillustrated); then, each of the lead wires is welded to the other end of a circuit board insertion conductor (unillustrated). An output terminal bolt 26 is inserted into a through-hole at one end portion, in the circumferential direction, of the first heat sink 21; an attachment bolt 27, which functions as a mounting member, extends from the front end of the fixing bolt 25 at the other end of the first heat sink 21.

As illustrated in FIG. 2, the protection cover 18 is mounted from the rear side in the axis direction to the rear bracket 3 in such a way as to cover the rectifier 16, the brush holder, and the voltage adjuster 17. The protection cover 18 is formed of an insulating resin and is produced in the shape of a bottomed tube including a cylindrical tubular portion 28 and a bottom portion 29 that closes oneside opening of the cylinder tubular portion 28; a plurality of inlets 30 are formed in the region, of the bottom portion 29, that faces the rectifier 16.

A through-hole 18a through which the output terminal bolt 26 passes is formed in a portion, of the bottom portion 29 in the protection cover 18, that faces the output terminal bolt 26; furthermore, a through-hole (unillustrated) through which the attachment bolt 27 of the fixing bolt 25 passes is formed in a portion, of the rectifier 16, that faces the fixing bolt 25; an insert coated conductor 31 formed as a member separated from the protection cover 18 is provided outside the bottom portion 29 of the protection cover 18 by means of a nut or the like, in such a way as to be suspended by the both bolts.

Figure 4:
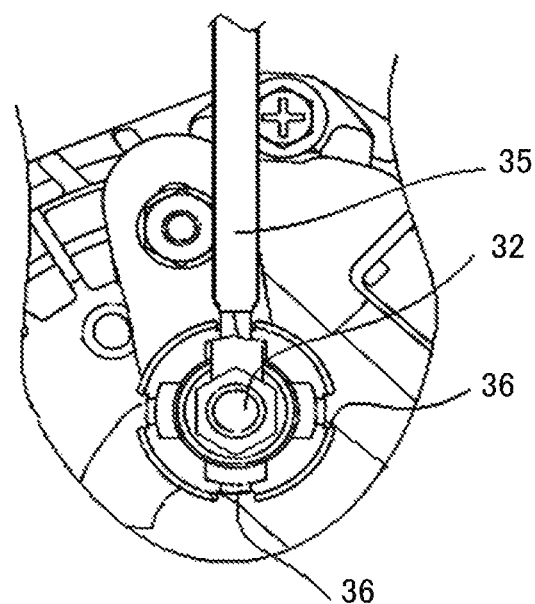
FIG. 4 is an enlarged view of the principal part for explaining the state where a vehicle harness is mounted on an output terminal portion of the vehicle AC power generator according to Embodiment 1 of the present invention.

A coated conductor output terminal portion 32 and an insertion conductor 33 are integrated and then are molded at a molding portion 34, so that the insert coated conductor 31 is formed. The insertion conductor 33 is exposes itself from the molding portion 34 at a terminal bolt through-hole 33a through which the output terminal bolt 26 passes and is electrically connected with the first heat sink 21, through the intermediary of a relay conductor 33b that makes surface contact with the insertion conductor 33, i.e., through the intermediary of the insertion conductor 33 and the relay conductor 33b that is connected with the insertion conductor 33 in a surface-contact manner. As illustrated in FIG. 4, a plurality of recess portions 36, which function as detent-function portions for a vehicle harness 35 that is mounted when the vehicle AC power generator is mounted in a vehicle, are formed around the coated conductor output terminal portion 32. When the insertion conductor 33 and the relay conductor 33b are connected with each other in a surface-contact manner, there is demonstrated an effect that heat generation, caused by an increase in the electric resistance or structural portions that are fastened with each other by means of a screw, is suppressed, that an unnecessary temperature rise in an electronic component such as a rectifying device, caused by heat generation, is prevented, or that thermal deterioration of peripheral components, caused by heat generation, and deterioration of fastening force, caused by thermal contraction, are prevented.

In the vehicle AC power generator 1, the output terminal bolt is mounted in the first heat sink 21 and is electrically connected with the cathode of each of positive-polarity-side rectifying devices 37 (refer to FIG. 3) through the intermediary of the first heat sink 21, so that the output terminal of the rectifier 16 is formed. Through the intermediary of the insertion conductor 33 of the insert coated conductor 31 that is mounted on the output terminal of the rectifier 16, the coated conductor output terminal portion 32 is connected electrically, so that the output terminal of the vehicle AC power generator 1 is formed. The anode of each of negative-polarity-side rectifying devices 38 (refer to FIG. 3) is grounded through the intermediary of the second heat sink 23 and the rear bracket 3. Moreover, at the unillustrated stator winding connection portion, the lead wire of the stator winding 14 is connected with the other end of the circuit board insertion conductor and hence is connected with each of the respective connection points between the positive-polarity-side rectifying devices 37 and the negative-polarity-side rectifying devices 38 for three phases. Furthermore, the magnetic-field winding 9 is connected with the voltage adjuster 17 through the intermediary of the slip ring 15 and the brush.

Next, the operation of the vehicle AC power generator 1 configured as described above will be explained.

At first, an electric current is supplied to the magnetic-field winding 9 of the rotor 8 by way of the brush (unillustrated) and the slip ring 15, so that magnetic flux is generated. Due to the magnetic flux, N-poles and S-poles are alternately formed in the circumferential direction at the outer circumference portion of the pole core 10.

Meanwhile, rotation torque of an engine (unillustrated) is transferred to the rotation axle 6 through the intermediary of a belt (unillustrated) and the pulley 7, so that the rotor 8 is rotated. Accordingly, a rotating magnetic field is provided to the stator winding 14 of the stator 12 and hence electromotive force is produced across the stator winding 14. The AC electromotive force is rectified by the rectifier 16 and is supplied to a vehicle loads and a battery. As a result, the vehicle loads is driven and the battery is charged.

The fans 11a and 11b rotate in conjunction with the rotation or the rotor 8. At the front side, cooling air flows into the front bracket 2 through the air inlet 2a and flows in the axis direction to the vicinity of the rotor 8. In the vicinity of the rotor 8, the cooling air is bent to the centrifugal direction by the fan 11a and then is exhausted through the air outlet 2b to the outside of the front bracket 2. At the rear side, cooling flows into the protection cover 18 through the inlet 30, further flows into the rear bracket 3 through the air inlet 3a, and then flows in the axis direction to the vicinity of the rotor 8. In the vicinity of the rotor 8, the cooling air is bent to the centrifugal direction by the fan 11b and then is exhausted through the air outlet 3b to the outside of the rear bracket 3.

Next, the flow of cooling air will be explained further in detail by use of FIG. 5.

Figure 5:
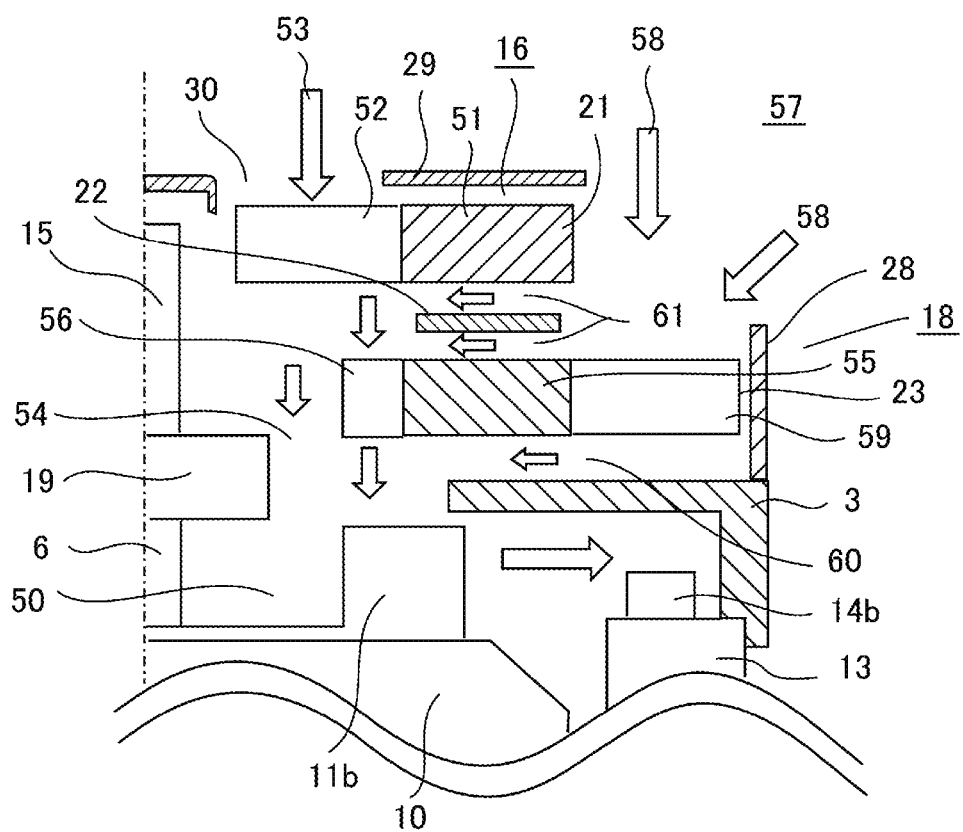
FIG. 5 is a schematic diagram for explaining the flow of cooling air around the rectifier in the vehicle AC power-generator according to Embodiment 1 of the present invention.

FIG. 5 is a schematic diagram for explaining the flow of cooling air in the vicinity of the rectifier 16 in the vehicle AC power generator 1. In FIG. 5, at first, a rotation of the fan 11b causes a negative pressure to occur in the region between the fan blade and the rotation axle 6. Because at the inner-diameter side of the rectifier 16, a negative pressure portion 50 is formed, there occurs a flow 53 of cooling air that flows into the protection cover 18 through the inlet 30 situated at the upstream side of a first inner-diameter-side fin 52 disposed at the inner-diameter side of a first rectifying device holding portion 51. The cooling air, which has flown into the protection cover 18, flows in the axis direction in the first inner-diameter-side fin 52 so as to absorb the heat of the positive-polarity-side rectifying device 37 held by the first rectifying device holding portion 51. Because the inner-diameter end portion of the second heat sink 23 is situated at the radial-direction outer side of the outer-diameter end portion of the bearing mounting portion 19, a space 54 is formed between the bearing mounting portion 19 and the second heat sink 23.

Part of the cooling air, which has passed through the first inner-diameter-side fin 52, flows in the axis direction in the second inner-diameter-side fin 56 disposed at the inner-diameter side of a second rectifying device holding portion 55, and absorbs the heat of the negative-polarity-side rectifying device 38 held by the second rectifying device holding portion 55. The cooling air, which has passed through the second inner-diameter-side fin 56, flows in the axis direction toward the negative pressure portion 50. The residual part of the cooling air that has flown through the first inner-diameter-side fin 52 flows through the space 54 in the axis direction toward the negative pressure portion 50 so as to absorb the heat of the bearings 5 held by the bearing mounting portion 19. In this situation, the first inner-diameter-side fin 52 and the second inner-diameter-side fin 56 are configured in such a way that the protrusion end of the first inner-diameter-side fin 52 is situated radial-direction inner side of the second inner-diameter-side fin 56.

Because at the outer-diameter side of the rectifier 16, the negative pressure portion 50 is formed, there occurs a flow 58 of cooling air that flows into the protection cover 18 through an inlet 57 situated at the outer-diameter upstream side of the first rectifying device holding portion 51. Part of the cooling air that has flown into the protection cover 18 flows in the axis direction along the outer-diameter surface of the first rectifying device holding portion 51 so as to absorb the heat of the positive-polarity-side rectifying device 37 held by the first rectifying device holding portion 51.

Part of the cooling air that flows into the protection cover 18 through the inlet 57 flows in the axis direction in the second outer-diameter-side fin 59 disposed at the outer-diameter side of the second rectifying device holding portion 55, and absorbs the heat of the negative-polarity-side rectifying device 38 held by the second rectifying device holding portion 55. The cooling air, which has passed through the second outer-diameter-side fin 59, flows through a space 60 formed between the second heat sink 23 and the rear bracket 3 toward the radial-direction inner side to the negative pressure portion 50.

The circuit board 22 is disposed spaced, in the axis direction, apart from each of the first rectifying device holding portion 51 and the second rectifying device holding portion 55. Accordingly, respective radial-direction ventilation paths 61 that each make the outer-diameter side of the rectifier 16 communicate in the radial direction with the inner-diameter side thereof are formed between the circuit board and the first rectifying device holding portion 51 and between the circuit board 22 and the second rectifying device holding portion 55. As a result, part of the cooling air that flows into the protection cover 18 through the inlet 57 branches; each of the air branches flows through the corresponding radial-direction ventilation path 61 toward the radial-direction inner side and joins the cooling air that has passed through the first inner-diameter-side fin 52.

As explained heretofore, in the vehicle AC power generator according to Embodiment 1, the output terminal directly connected with the vehicle harness 35 includes the insert coated conductor 31, as a separate member, that is supported by the output terminal bolt 26, of the rectifier 16, that extends to the outside of one axle-direction side of the protection cover 18 and by the attachment bolt 27 that penetrates the through-hole 18 formed in the bottom portion 29 of the protection cover 18 and is fixed to a portion, at one axle-direction side, of the housing 4; thus, because it is not required to downsize the protection cover 18 that covers heat-generating components, the coolabilty is not deteriorated. Furthermore, the flexibility in positioning the output terminal with which the vehicle harness 35 is connected can be raised without newly producing the protection cover 18. Therefore, unlike the insert coated conductor disclosed in Patent Document 1, at is not required to widely cover the rear surface of the protection cover and hence an inlet for the rectifier 16, especially, can almost be secured; thus, there demonstrated an effect that the coolabilty is not deteriorated.

Moreover, in the rectifier 16 provided in the vehicle AC power generator 1, the protrusion end of the first inner-diameter-side fin 52 is situated at a more inner side in the radial direction than the protrusion end of the second inner-diameter-side fin 56; in the vicinity of the protrusion end of the first inner-diameter-side fin 52, there exists no overlap in the axis direction between the first inner-diameter-side fin 52 and the second inner-diameter-side fin 56; thus, the pressure loss at a time when cooling air flows through the inner-diameter side of the rectifier 16 is reduced. When viewed from the axis direction, the rectifier 16 is configured in such a way that the first inner-diameter-side fin 52 and the second inner-diameter-side fin 56 overlap with each other while the respective protrusion directions thereof are the same, i.e., in such a way that the second inner-diameter-side fin 56 does not run off the edge of the first inner-diameter-side fin 52; therefore, the pressure loss at a time when cooling air flows through the inner-diameter side of the rectifier 16 is further reduced. Accordingly, the amount of cooling air that flows through the inner-diameter side of the rectifier 16 increases and hence the positive-polarity-side rectifying device 37 can effectively be cooled. Moreover, because part of cooling air that has passed through the first inner-diameter-side fin 52 does not flow through the second inner-diameter-side fin 56, the cooling air whose temperature is suppressed from rising is served to cooling the bearing mounting portion 19; thus, the bearings 5 can effectively be cooled. In whatever manner it is disposed, the foregoing insert coated conductor 31, as a separate member, is formed of a material having a high coolability for the rectifier 16; thus, the coolability of the vehicle AC power generator 1 can be secured.

Furthermore, because the inlet 57 is opened up to the vicinity of the second outer-diameter-side fin 59 in part of the cylindrical tubular portion 28, i.e., because the region where the bottom portion 29 and the circumferential wall portion of the protection cover 18 intersect each other is opened and the protrusion end of the second outer-diameter-side fin 59 overlaps nothing in the axis direction, the pressure loss at a time when cooling air flows through the outer-diameter side of the rectifier 16 is reduced. Because cooling air that flows through the outer-diameter side of the rectifier 16 is directly supplied to the second outer-diameter-side fin 59, the negative-polarity-side rectifying device 38 can efficiently be cooled.

The respective radial-direction ventilation paths 61 are formed between the circuit board 22 and the first rectifying device holding portion 51 and between the circuit board 22 and the second rectifying device holding portion 55. As a result, part of the cooling air whose temperature has not raised and that flows into the protection cover 18 through the inlet 57 branches; each of the air branches passes through the corresponding radial-direction ventilation path 61 and flows into the inner-diameter side of the rectifier 16. Without raising its own temperature, the cooling air that has passed through the radial-direction ventilation path 61 and has flown into the inner-diameter side of the rectifier 16 joins the cooling air that has passed through the first inner-diameter-side fin 52. As a result, the temperature of the cooling air that has passed through the first inner-diameter-side fin 52 falls. Then, part of the cooling air whose temperature has fallen passes through the second inner-diameter-side fin 56, so that the negative-polarity-side rectifying device 38 can efficiently be cooled. The residual part of the cooling air whose temperature has fallen passes through the space 54, so that the bearing mounting portion 19 and the bearings 5 can efficiently be cooled.

Figure 6:
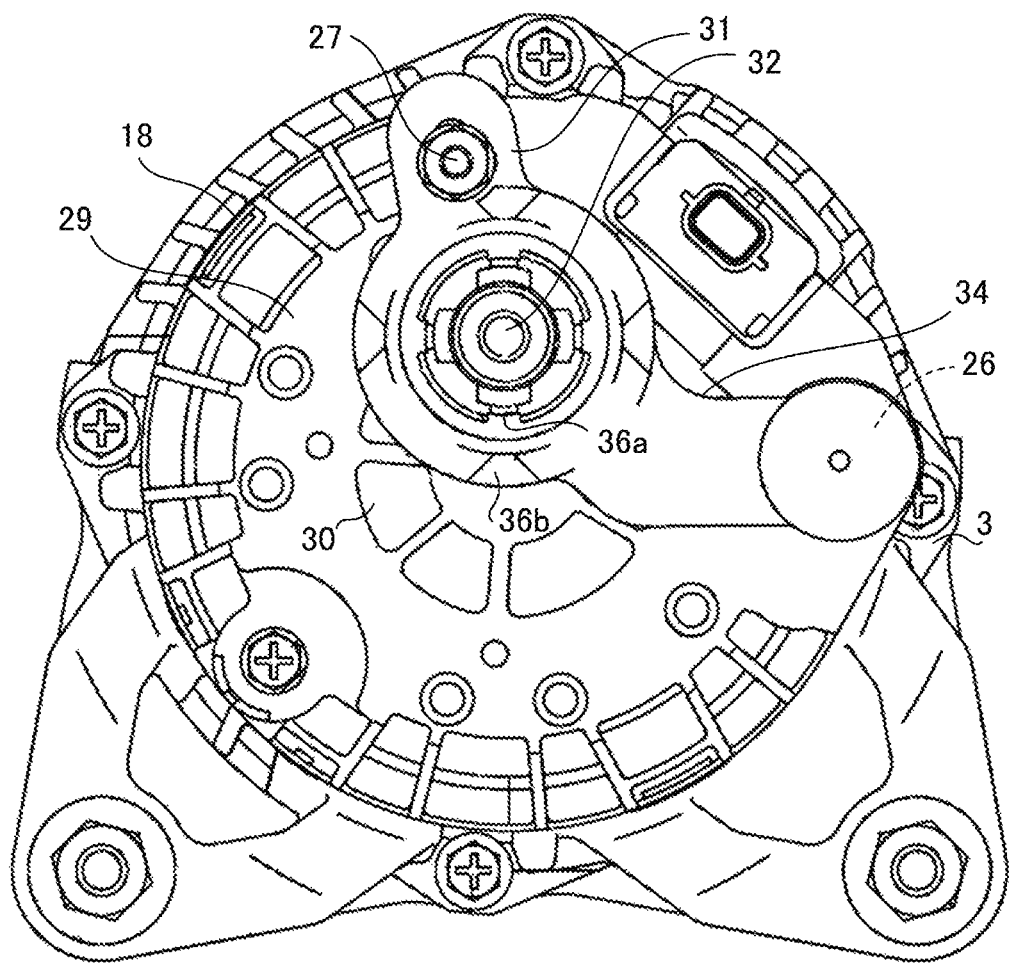
FIG. 6 is a rear view of a vehicle AC power generator according to a variant example of Embodiment 1 of the present invention.

Another example can be applied to the insert coated conductor 31; the insert coated conductor 31 may be the one in which as indicated by Reference Characters 36a and 36b in FIG. 6, there are formed double recess portions included in the detent-function portion of the vehicle harness 35. When formed of the protection cover 18, the insert coated conductor 31 protrudes from the contour of the electric power generator when viewed from the rear surface; however, a compact configuration can be realized by the present Embodiment.

Embodiment 2

Next, a vehicle AC power generator according to Embodiment 2 of the present invention will be explained.

Figure 7:
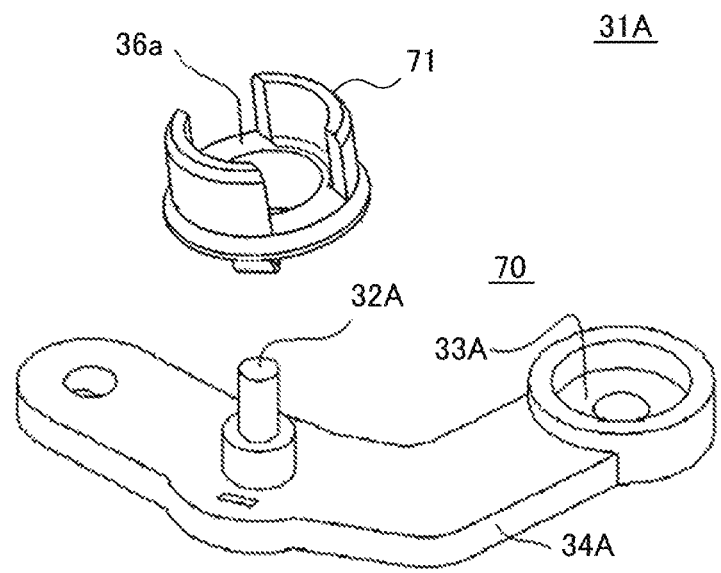
FIG. 7 is a schematic views of an insert coated conductor according to Embodiment 2 of the present invention.

FIG. 7 is a schematic view of the insert coated conductor 31A in the vehicle AC power generator according to Embodiment 2 of the present invention; the insert coated conductor 31A is formed of a main body 70 in which a coated conductor output terminal portion 32A and an insertion conductor 33A are mold-formed and a ring-shaped portion 71 that is engaged with the circumferential portion of the coated conductor output terminal portion 32A of the main body 70. The ring-shaped portion 71 has one or more vehicle harness detent-function portions that are annularly arranged; FIG. 7 illustrates the ring-shaped portion 71 in which as the vehicle harness detect-function portion, two recess portions 36 are formed in the circumferential portion thereof. Reference Character 34A designates the mold portion of an insertion conductor (unillustrated). Other configurations are the same as those in Embodiment 1; thus, explanations therefor will be omitted.

Because there exist a large variety of vehicle harnesses 35 that are mounted at a time when a vehicle is equipped with a vehicle AC power generator, it is required to prepare a large number of shapes of the detent-function portion; in Embodiment 1, it is required to prepare a large number of insert coated conductors 31; thus, the cost is high, even though it is not so high as that of the protection cover 18. However, when the insert coated conductor 31 is configured in such a manner as Embodiment 2, the main body 70, especially, that becomes large-sized can be produced as an universal component; thus, the vehicle AC power generator can be accommodated to a vehicle only by preparing a large number of ring-shaped portions 71 that are relatively small and hence a more cost-advantage vehicle AC power generator can be obtained. The ring-shaped portion 71 can be attached only by inserting into the main body 70; thus, that does not pose any designing problem.

Embodiment 3

Figure 8:
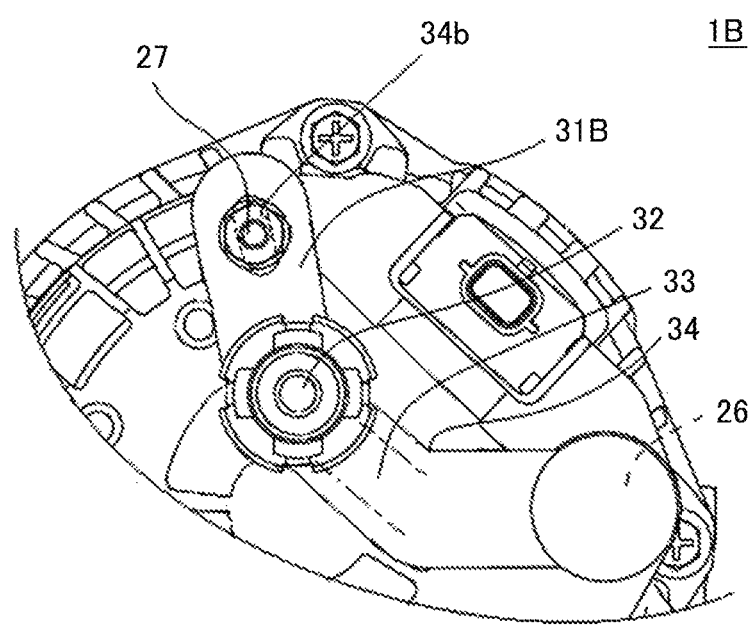
FIG. 8 is a partial rear view of a vehicle AC power generator according to Embodiment 3 of the present invention.

Next, a vehicle AC power generator according to Embodiment 3 of the present invention will be explained. FIG. 8 is a partial rear view of a vehicle AC power generator according to Embodiment 3 of the present invention. In a vehicle AC power generator 1B according to Embodiment 3, the mounting hole formed in an insert coated conductor 31B is an elongate hole. The configurations of the other members including the coated conductor output terminal portion 32, the insertion conductor 33, and the recess portion 36, which functions as a detent-function portion, are the same as those in Embodiment 1; therefore explanations therefor will be omitted.

As in Embodiment 3, when for example, a through-hole that is penetrated by the attachment bolt 27 of the fixing bolt 25 in the rectifier 16 is formed of an elongated hole 34b, it is made possible that rectifiers 16 having partially different sizes can be dealt with by only one kind of insert coated conductor 31. Describing in detail, the components that are disposed at the rear side of the rear bracket 3 and are covered by the protection cover 18 are designed basically with respect to the axis; among those components, the rectifiers 16 include the ones whose respective positions of the fixing bolt portions that perform fixing differ in the radial direction and whose respective positions of the through-hole portions of the output terminal bolts 26 are the same. The insert coated conductor 31B, as a universal component, can deal with those rectifiers 16 and can avoid the cost hike.

In the foregoing embodiments, the number of poles of the rotor 8 is 12 and the number of slots of the stator iron core is 72; however, the number of poles and the number of slots are not limited thereto.

In the foregoing embodiments, the case where the number of slots per pole and phase is 2 has been explained; however, the number of slots per pole and phase is not limited to 2.

In the foregoing embodiments, the positive-polarity-side rectifying device 37 is the first rectifying device that is mounted on the first heat sink 21 and the negative-polarity-side rectifying device 38 is the second rectifying device that is mounted on the second heat sink 23; however, it may be allowed that the positive-polarity-side rectifying device 37 is the second rectifying device that is mounted on the second heat sink 23 and the negative-polarity-side rectifying device 38 is the first rectifying device that is mounted on the first heat sink 21.

Embodiments 1 through 3 of the present invention have been explained heretofore; however, the present invention is not limited thereto. In the scope within the spirits of the present invention, the configurations thereof can appropriately be combined with one another, can partially be modified, or can partially be omitted.

The invention claimed is:
1. A vehicle AC power generator comprising:
a rotor that is fixed on a rotation axle pivotably supported by a housing and is disposed in the housing;
a stator that has a stator iron core and a stator winding wound around the stator iron core and is supported by the housing in such a way as to surround the rotor;
a rectifier that is disposed at the outside of one axle-direction side of the housing, that is fixed to the housing, and that rectifies AC electromotive force generated across the stator winding;
a voltage adjuster that is disposed at the outside of one axle-direction side of the housing, that is fixed to the housing, and that adjusts the voltage value of the AC electromotive force to a specified value; and
a resin-made protection cover that is produced in the shape of a bottomed tube having a bottom portion and a tubular circumferential wall portion and that is mounted on the housing in such a way as to cover the rectifier and the voltage adjuster,
wherein there are provided
an attachment member that penetrates a through-hole formed in the bottom portion of the protection cover and is fixed to a portion at one axle-direction side of the housing,
an output terminal that extends from the rectifier toward the outside of one axle-direction side of the protection cover, and
an insert coated conductor that is supported by the output terminal and the attachment member, that is provided on the rear surface of the protection cover, and that is formed as a member separated from the protection cover.

2. The vehicle AC power generator according to claim 1, wherein an insertion conductor of the insert coated conductor is electrically connected with a heat sink for the rectifier, through the intermediary of a relay conductor that makes surface contact with the insertion conductor.

3. The vehicle AC power generator according to claim 1, further including:
an inlet, for cooling air, that is formed in the bottom portion of the protection cover and is disposed at one axle-direction side of the housing in such a way as to cover the rectifier;
an air inlet formed in a portion, of the housing, that faces an axis-direction endface of the rotor; and
an air outlet formed in a portion, of the housing, that faces the stator winding,
wherein there is formed a ventilation path for the cooling air that flows into the housing through the inlet and the air inlet, due to rotation of a fan provided on the rotor, and is bent toward the centrifugal direction by the fan so as to be exhausted through the air outlet,
wherein the rectifier includes
a first heat sink having a tabular, first rectifying device holding portion disposed on a plane perpendicular to the axis direction of the housing,
a plurality of first rectifying devices held by the first rectifying device holding portion,
a second heat sink having a tabular, second rectifying device holding portion that is apart toward the housing from the first rectifying device holding portion and is disposed on a plane perpendicular to the axis direction of the housing,
a plurality of second rectifying devices held by the second rectifying device holding portion, and
a circuit board for connecting the plurality of first rectifying devices with the plurality of second rectifying devices so as to form a bridge circuit, and
wherein the region where the bottom portion of the protection cover and the tubular circumferential wall portion intersect each other is opened.

4. The vehicle AC power generator according to claim 1, wherein in the insert coated conductor, a coated conductor output terminal portion and the insertion conductor are mold-formed and at least one vehicle harness detent-function portion is provided around the coated conductor output terminal portion.

5. The vehicle AC power generator according to claim 1, wherein the insert coated conductor is formed of a main body in which a coated conductor output terminal portion and an insertion conductor are mold-formed and a member that is engaged with the circumferential portion of the coated conductor output terminal portion of the main body, and
wherein the member has at least one vehicle harness detent-function portion.

6. The vehicle AC power generator according to claim 1, wherein a hole, of the insert coated conductor, that is penetrated by the attachment member is formed of an elongate hole.

* * * * *